(12) United States Patent
Wierstra et al.

(10) Patent No.: US 11,790,238 B2
(45) Date of Patent: Oct. 17, 2023

(54) MULTI-TASK NEURAL NETWORKS WITH TASK-SPECIFIC PATHS

(71) Applicant: DeepMind Technologies Limited, London (GB)

(72) Inventors: Daniel Pieter Wierstra, London (GB); Chrisantha Thomas Fernando, London (GB); Alexander Pritzel, London (GB); Dylan Sunil Banarse, Cambridge (GB); Charles Blundell, London (GB); Andrei-Alexandru Rusu, London (GB); Yori Zwols, London (GB); David Ha, Tokyo (JP)

(73) Assignee: DeepMind Technologies Limited, London (GB)

( * ) Notice: Subject to any disclaimer, the term of this patent is extended or adjusted under 35 U.S.C. 154(b) by 612 days.

(21) Appl. No.: 16/995,655

(22) Filed: Aug. 17, 2020

(65) Prior Publication Data

US 2020/0380372 A1    Dec. 3, 2020

Related U.S. Application Data

(60) Division of application No. 16/526,240, filed on Jul. 30, 2019, now Pat. No. 10,748,065, which is a
(Continued)

(51) Int. Cl.
*G06N 3/04* (2023.01)
*G06N 3/086* (2023.01)
(Continued)

(52) U.S. Cl.
CPC ............... *G06N 3/086* (2013.01); *G06N 3/04* (2013.01); *G06N 3/044* (2023.01); *G06N 3/045* (2023.01)

(58) Field of Classification Search
None
See application file for complete search history.

(56) References Cited

U.S. PATENT DOCUMENTS 10,452,974 B1    10/2019 Coscic
10,748,065 B2    8/2020 Wierstran
(Continued)

FOREIGN PATENT DOCUMENTS

JP    2015210747 A    * 11/2015

OTHER PUBLICATIONS

Auerbach et al., "Online extreme evolutionary learning machines," Artificial Life 14: Proceedings of the Fourteenth International Conference on the Synthesis and Simulation of Living Systems, 2014, 8 pages.
(Continued)

*Primary Examiner* — David R Vincent
(74) *Attorney, Agent, or Firm* — Fish & Richardson P.C.

(57) ABSTRACT

Methods, systems, and apparatus, including computer programs encoded on computer storage media, for using multi-task neural networks. One of the methods includes receiving a first network input and data identifying a first machine learning task to be performed on the first network input; selecting a path through the plurality of layers in a super neural network that is specific to the first machine learning task, the path specifying, for each of the layers, a proper subset of the modular neural networks in the layer that are designated as active when performing the first machine learning task; and causing the super neural network to process the first network input using (i) for each layer, the modular neural networks in the layer that are designated as active by the selected path and (ii) the set of one or more output layers corresponding to the identified first machine learning task.

20 Claims, 6 Drawing Sheets

Related U.S. Application Data continuation of application No. PCT/US2018/016024, filed on Jan. 30, 2018.

(60) Provisional application No. 62/452,276, filed on Jan. 30, 2017.

(51) Int. Cl.
  *G06N 3/044* (2023.01)
  *G06N 3/045* (2023.01)

(56) References Cited

U.S. PATENT DOCUMENTS

| | | |
|---|---|---|
| 2017/0011281 A1 | 1/2017 | Dijkman |
| 2017/0358293 A1 | 12/2017 | Chua |
| 2018/0203956 A1 | 7/2018 | Ng |
| 2019/0354868 A1 | 11/2019 | Wierstran |

OTHER PUBLICATIONS

Braylan et al., "Reuse of neural modules for general video game playing," Proceedings of the 30th AAAI Conference on Artificial Intelligence, Feb. 2016, 7 pages.
Caruana, "Multitask learning," Machine Learning, Jul. 1997, 28:41-75.
Chandra et al., "Evolutionary multi-task learning for modular training of feedforward neural networks," Lecture Notes in Computer Science, Sep. 2016, 10 pages.
Chen et al., "Net2net: Accelerating learning via knowledge transfer," CoRR, Nov. 2015, arxiv.org/abs/1511.05641, 12 pages.
Fernando et al., "Evolvable neuronal paths: a novel basis for information and search in the brain," Plos One, Aug. 2011, 6(8):e23534.
Fernando et al., "Selectionist and evolutionary approaches to brain function: a critical appraisal," Frontiers in Computational Neuroscience, Apr. 2012, 28 pages.
Frank et al., "Interactions between frontal cortex and basal ganglia in working memory: a computational model," Cognitive, Affective, & Behavioral Neuroscience, 2001, 24 pages.
Harvey, "The microbial genetic algorithm," Evolutionary and Adaptive Systems Group, 2011, 8 pages.
Hazy et al., "Towards an executive without a homunculus: computational models of the prefrontal cortex/basal ganglia system," Philosophical Transactions of the Royal Society B: Biological Sciences, 2017, 13 pages.
Hinton et al., "Distilling the knowledge in a neural network," CoRR, Mar. 2015, arxiv.org/abs/1503.02531, 9 pages.
Jaderberg et al., "Reinforcement learning with unsupervised auxiliary tasks," CoRR, Nov. 2016, https://arxiv.org/abs/1503.02531, 14 pages.
Jou et al., "Deep cross residual learning for multitask visual recognition," Proceedings of the 2016 ACM Conference on Multimedia, Oct. 2016, 9 pages.
LeCun et al., "Gradient-based learning applied to document recognition," Proceedings of the IEEE, Nov. 1998, 46 pages.
Liu et al., "Dynamic deep neural networks: optimizing accuracy-efficiency trade-offs by selective execution," CoRR, Jan. 2017, arxiv.org/abs/1701.00299, 12 pages.
Minh et al., "Asynchronous methods for deep reinforcement learning," ICML, Jun. 2016, 19 pages.
Misra et al., "Cross-stitch networks for multi-task learning," Proceedings of the 2016 IEEE Conference on Computer Vision and Pattern Recognition, Jun. 2016, 10 pages.
Netzer et al., "Reading digits in natural images with unsupervised feature learning," NIPS, 2011, 9 pages.
O'Reilly, "Making working memory work: a computational model of learning in the prefrontal cortex and basal ganglia," Neural Computation, 2006, 46 pages.
Osband et al., "Deep exploration via bootstrapped dqn," Advances in Neural Information Processing Systems 29, Jul. 2016, 18 pages.
PCT International Preliminary Report on Patentability in International Application No. PCT/US2018/016024, dated Aug. 8, 2019, 12 pages.
PCT International Search Report and Written Opinion in International Application No. PCT/US2018/016024, dated May 8, 2018, 18 pages.
Ring, "Continual Learning in Reinforcement Environments," Thesis for the degree of Doctor of Philosophy, University of Texas at Austin, Aug. 1994, 138 pages.
Rusu et al., "Progressive neural networks," CoRR, Sep. 2016, arxiv.org/abs/1606.04671, 14 pages.
Saxena et al., "Convolutional neural fabrics," Advances in Neural Information Processing Systems 29, Oct. 2016, 14 pages.
Shazeer et al., "Outrageously large neural networks: The sparsely-grated mixture of-experts layer," CoRR, Jan. 2017, arxiv.org/abs/1701.06538, 19 pages.
Singh et al., "Swapout: Learning an ensemble of deep architectures," Advances in Neural Information Processing Systems 29, May 2016, 9 pages.
Srivastava et al., "Dropout: a simple way to prevent mneural networks from overfitting," Journal of Machine Learning Research, Jun. 2013, 15(1): 30 pages.
Taylor et al., "An introduction to intertask transfer for reinforcement learning," Association for the Advancement of Artificial Intelligence, 2011, 20 pages.

* cited by examiner

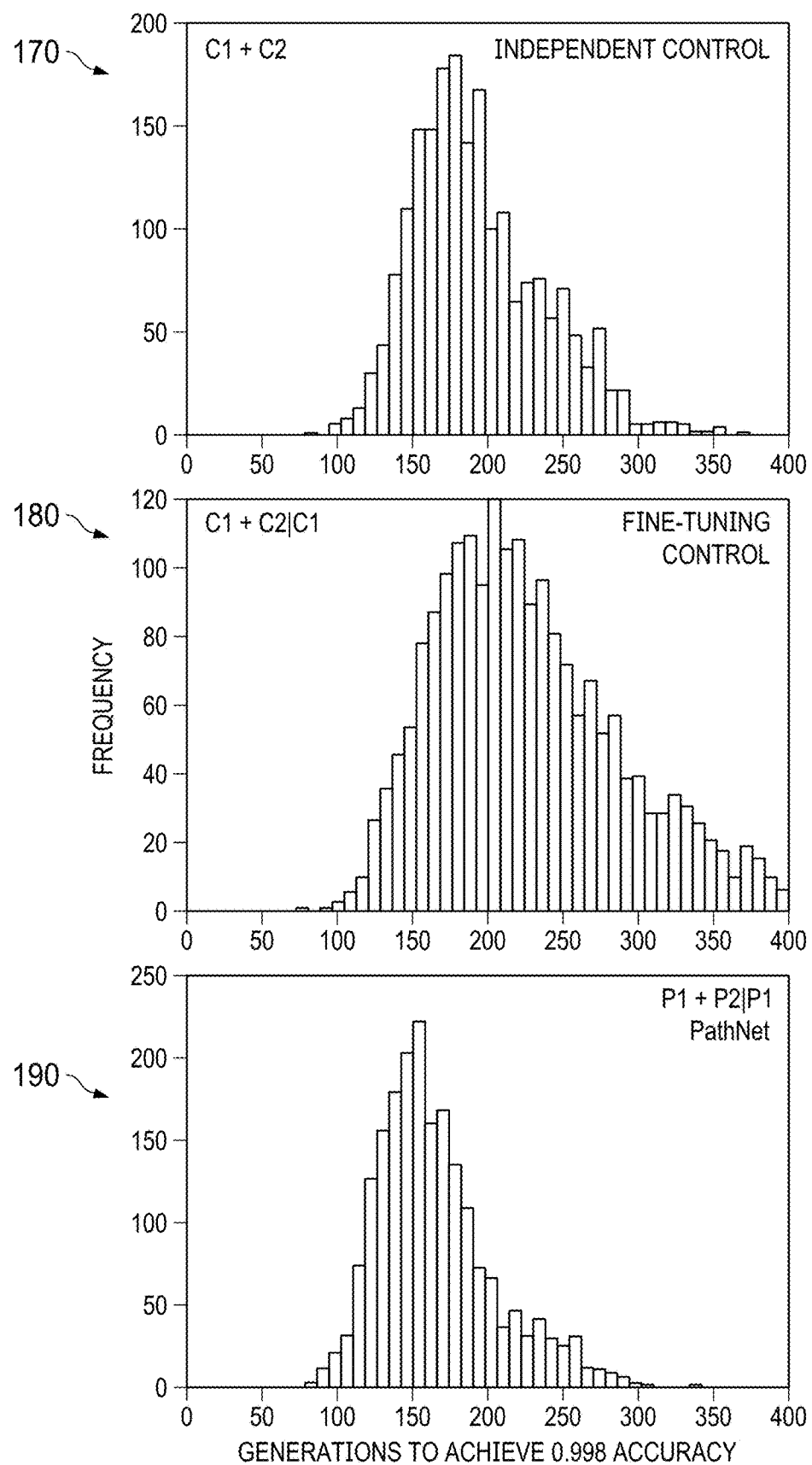

MULTI-TASK NEURAL NETWORKS WITH TASK-SPECIFIC PATHS

CROSS-REFERENCE TO RELATED APPLICATIONS

This application is a divisional of U.S. application Ser. No. 16/526,240, filed on Jul. 30, 2019, which is a continuation of and claims priority to PCT Application No. PCT/US2018/016024, filed on Jan. 30, 2018, which claims priority to U.S. Provisional Application No. 62/452,276, filed on Jan. 30, 2017. The disclosures of the prior applications are considered part of and are incorporated by reference in the disclosure of this application.

BACKGROUND

This specification relates to neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that allows the same neural network to be used to perform multiple machine learning tasks.

Thus in one aspect a system comprising one or more computers and one or more storage devices storing instructions that when executed by the one or more computers cause the one or more computers to implement a super neural network. The super neural network comprises a plurality of layers arranged in a stack one after the other. Each layer comprises a respective plurality of modular neural networks, and the modular neural networks in each layer are each configured to receive a layer input for the layer and to generate a respective modular output. The super neural network also comprises a plurality of sets of one or more output layers, wherein each set of output layers corresponds to a different machine learning task from a plurality of machine learning tasks, and wherein each set of one or more output layers is (collectively) configured to receive a stack output and to generate a neural network output that is specific to the corresponding machine learning task. The system also includes a subsystem configured to perform operations comprising: receiving a first network input and data identifying a first machine learning task from the plurality of machine learning tasks to be performed on the first network input; selecting a path through the plurality of layers that is specific to the first machine learning task, the path specifying, for each of the layers, a proper subset of the modular neural networks in the layer that are designated as active when performing the first machine learning task; and causing the super neural network to process the first network input using (i) for each layer, the modular neural networks in the layer that are designated as active by the selected path and (ii) the set of one or more output layers corresponding to the identified first machine learning task.

As described in more detail later, examples of the described systems are able to learn and execute multiple tasks effectively.

In some implementations the super neural network further comprises: a respective combining layer after each of the plurality of layers in the stack. Each combining layer may be configured to receive the modular outputs generated by the currently active modular neural networks in the layer before the combining layer; and combine the modular outputs generated by the currently active modular neural networks to generate a combined output. In some implementations the combined output for each combining layer other than the combining layer that is after the last layer in the stack is the layer input for the layer after the combining layer. The combined output for the combining layer that is after the last layer in the stack may be the stack output.

Each modular neural network may comprise one or more neural network layers followed by a transfer function layer that applies a transfer function to an output of the neural network layers. The transfer function may be an element-wise activation function, for example a rectified linear unit function.

At least one of the modular neural networks may include one or more recurrent neural network layers. Some or all of the recurrent neural network layers may be long-short term memory (LSTM) layers.

At least one of the modular neural networks may include a convolutional neural network layer. At least one of the modular neural networks may include a fully-connected neural network layer.

At least two layers may have different numbers of active modular neural networks in the proper subset. Each layer may have at least one and no more than a predetermined number of active modular neural networks in the proper subset.

The operations performed by the subsystem may further comprise: receiving a second network input and data identifying a second, different machine learning task from the plurality of machine learning tasks to be performed on the second network input; selecting a second, different path through the plurality of layers that is specific to the second machine learning task, the second path specifying, for each of the layers, a second proper subset of the modular neural networks in the layer that are designated as active when performing the second machine learning task; and causing the super neural network to process the second network input using (i) for each layer, the modular neural networks in the layer that are designated as active by the second path and (ii) the set of one or more output layers corresponding to the second machine learning task.

There is also described a method of training a super neural network as described above on a particular machine learning task from the plurality of machine learning tasks. The method may comprise: selecting a plurality of candidate paths through the plurality of layers, each of the candidate paths specifying, for each of the layers, a respective proper subset of the modular neural networks in the layer that are designated as active when performing the particular machine learning task; training the super neural network on each of the plurality of candidate paths, wherein training the super neural network on each of the plurality of candidate paths comprises, for each of the candidate paths, training the super neural network while processing training inputs only using the modular neural networks designated as active by the candidate paths and the output layer corresponding to the particular machine learning task; determining a fitness of each of the plurality of candidate paths based on results of the training of the super neural network on the candidate path; and selecting the candidate path having the best fitness as a best fit path for the particular machine learning task.

In some implementations of the method evolution and learning may take place simultaneously. The method may evolve a population of pathways through the super neural network towards a limited subset of the super neural network parameters and may then fix these after learning to retain the corresponding functionality.

Selecting the plurality of candidate paths may comprise selecting a first candidate path and a second candidate path; determining, from training the super neural network on the first candidate path and the second candidate path, that the first candidate path has a better fitness than the second candidate path; and based on determining that the first candidate path has a better fitness than the second candidate path: mutating the first candidate path by changing one or more of the active modular neural networks in the first candidate path; and replacing the second candidate path with the mutated first candidate path.

Mutating the first candidate path may comprise, for each modular neural network designated as active by the first candidate path: determining whether to replace the modular neural network; and in response to determining to replace the modular neural network, designating the modular neural network as inactive and designating another modular neural network in the same layer as active. Determining whether to replace the modular neural network may comprises determining to replace the modular neural network with probability that is equal to or proportional to 1 divided by a total number of modular neural networks in the first candidate path.

Training the super neural network on each of the plurality of candidate paths may comprise training the super neural network on an initial plurality of candidate paths in parallel. Selecting the plurality of candidate paths may comprise, for each candidate path in the initial plurality: determining whether any of a subset of other candidate paths in the initial plurality has a better fitness than the candidate path; and if any of the subset have a better fitness: identifying the candidate path in the subset that has a best fitness of the other candidate paths in the subset; mutating the identified candidate path by changing one or more of the active modular neural networks in the identified candidate path; and replacing the candidate path with the mutated identified candidate path. Selecting the plurality of candidate paths may further comprise, if none of the candidate paths in the subset have a better fitness, maintaining the candidate path for further training. For each candidate path in the initial plurality the subset of other candidate paths may be chosen randomly.

Training the super neural network on each of the plurality of candidate paths may comprise, during the training, holding fixed values of parameters of any modular neural networks that are in best fit paths for any machine learning tasks in the plurality of machine learning tasks for which a best fit path has already been determined.

The method may further comprise fixing values of parameters of modular neural networks that are designated as active by the best fit path for the particular machine learning task to not be adjusted during training of the super neural network on other tasks in the plurality of machine learning tasks.

There is further described a method of training the super neural network as described above on the plurality of machine learning tasks in sequence from a first machine learning task in the sequence to a last machine learning task in the sequence. The method may comprise obtaining first training data for a first machine learning task; and training the super neural network on the first training data to determine a best fit path through the plurality of layers for the first machine learning task while (i) holding fixed values of parameters of any modular neural networks that are in best fit paths for any of the machine learning tasks that are earlier in the sequence than the first machine learning task and (ii) adjusting values of parameters of other modular neural networks that are not in best fit paths for any of the machine learning tasks that are earlier in the sequence than the first machine learning task.

In some implementations fixing parameters along a first path learned for a first task facilitates faster learning of a second task which may re-use parts of the first path The method may further comprise re-initializing values of parameters of modular neural networks that are not in the best fit path for the first machine learning task or any of the best fit paths for any of the machine learning tasks that are earlier in the sequence than the first machine learning task; obtaining second training data for a second machine learning task that follows the first machine learning task in the sequence; and training the super neural network on the second training data to determine a best fit path through the plurality of layers for the second machine learning task while (i) holding fixed values of parameters of any modular neural networks that are in the best fit path for the first machine learning task or any of the best fit paths for any of the machine learning tasks that are earlier in the sequence than the first machine learning task and (ii) adjusting values of parameters of other modular neural networks that are not in the best fit path for the first machine learning task or any of the best fit paths for any of the machine learning tasks that are earlier in the sequence than the first machine learning task.

Training the super neural network on the first training data to determine a best fit path through the plurality of layers for the first machine learning task may comprise selecting a plurality of candidate paths; and for each of the plurality of candidate paths: evaluating a fitness of the candidate path by training the super neural network on the first machine learning task with the modular neural networks in the candidate path designated as active; and selecting a candidate path with the best fitness as a current best path. The method may further comprise mutating the current best path to generate a mutated current best path; and including the mutated current best path in a new plurality of candidate paths for evaluation.

Particular embodiments of the subject matter described in this specification can be implemented so as to realize one or more of the following advantages.

By allowing the same super neural network to be used for multiple tasks, the system consumes fewer computational resources, i.e., memory and processing power, than conventional systems i.e., systems that use a different neural network for each task, while still having a performance that is equivalent to or better than conventional approaches. In particular, because the system does not have to store multiple different neural networks for multiple different machine learning tasks, the system can use less of its storage capacity.

Additionally, when training the super neural network on a new task, the system effectively makes use of parameter values determined while training the super neural network on previous tasks. Therefore, using the described techniques, the super neural network can be trained more quickly and using fewer computational resources than conventional approaches. In particular, by fixing the parameter values of modular neural networks that have already been included in the path for an existing task and allowing those modular neural networks to be included in candidate paths for the new task, the system can leverage similarities between tasks to reduce the training time and training complexity for the new task. This allows the super neural network to achieve improved performance on the new task while reducing the training time for the new task as compared to conventional approaches.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1C shows graphs of various approaches of training neural networks to perform multiple tasks.

Like reference numbers and designations in the various drawings indicate like elements.

DETAILED DESCRIPTION

Figure 1A:
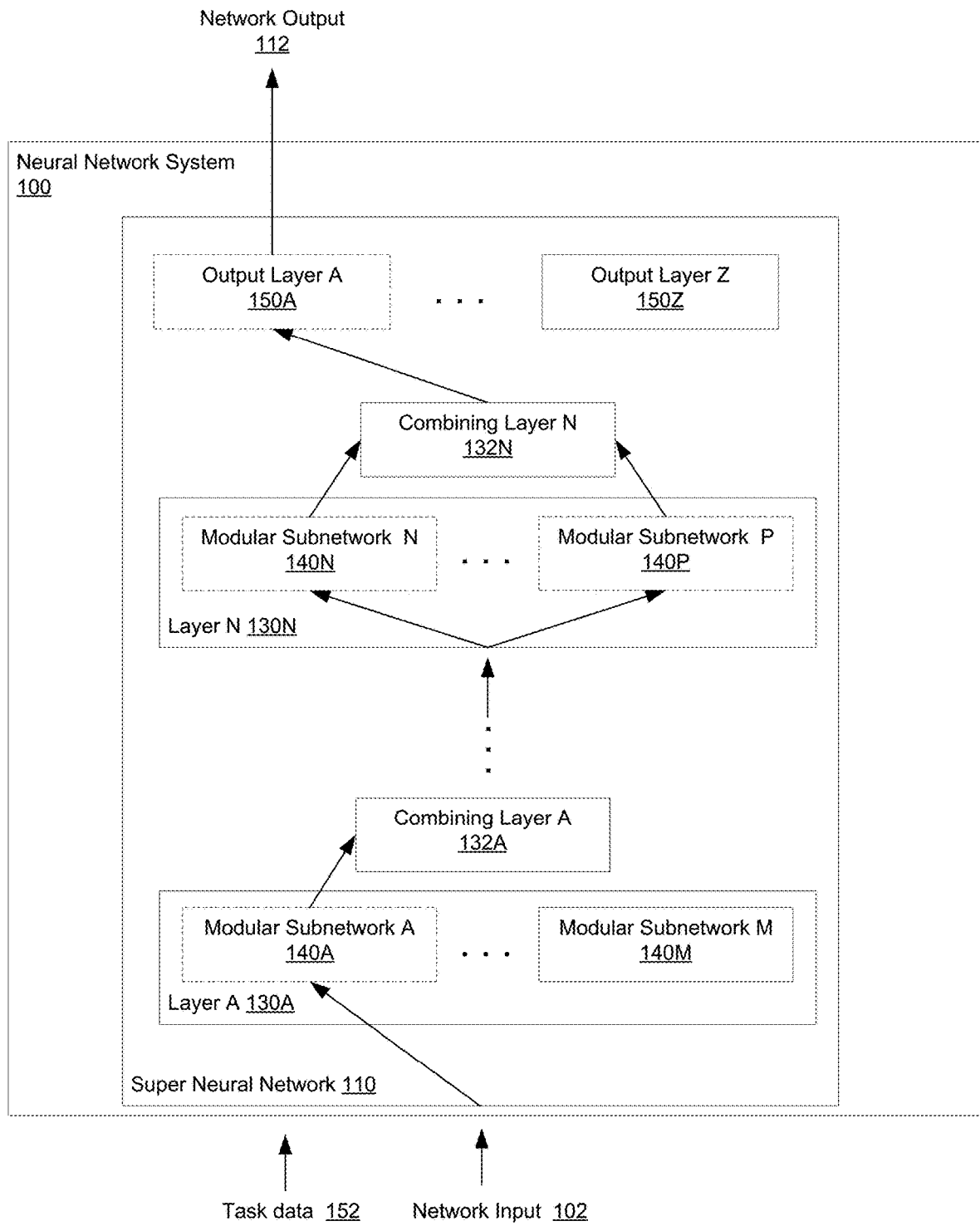
FIG. 1A shows an example neural network system.

This specification describes a system implemented as computer programs on one or more computers in one or more locations that allows the same neural network to be used to perform multiple different machine learning tasks. Some or all of the tasks may be reinforcement learning tasks, although the techniques described are generally applicable to many different neural network tasks, also including supervised and unsupervised learning, and data classification.

For example, the multiple machine learning tasks may include multiple different image processing tasks, e.g., one or more different image recognition tasks, where each image recognition task requires the recognition of a different object or pattern in an image. More generally the tasks may include tasks to generate any kind of score of classification or regression output for a digital data input.

As another example, the multiple machine learning tasks can include multiple different speech recognition tasks, e.g., multiple hotword detection tasks, where each task requires the recognition of a different hotword or sequence of hotwords, speech recognition tasks that require recognizing speech in different languages, and so on.

The tasks may also include processing a sequence of data such as a sequence of text or a spoken utterance and the output may be the sequence translated into a different language or representation.

As another example, the multiple machine learning tasks may include different robot learning tasks, i.e., tasks that involve selecting actions to be performed by a robot interacting with an environment. That is, some or all of the multiple machine learning tasks may include selecting actions to be performed by the same robot attempting to perform different tasks, different robots attempting to perform the same task, or different robots attempting to perform different tasks. For example, a first machine learning task may include a sensorimotor learning task such as locomotion. A second machine learning task may include a second sensorimotor learning task such as grasping. Subsequent machine learning tasks may include other sensorimotor learning tasks such as active object categorization, or interactive learning tasks such as joint manipulation of an object with a human peer, or linguistic learning tasks.

More generally the tasks may include any machine control task. An input to the system may include real-world data from an environment in which the machine operates and an output from the system may include a machine control output to control the machine to perform a task. Alternatively the environment may be a simulated environment, an input to the system may be from the simulated environment and an output from the system may control an entity in the simulated environment.

As another example, the multiple machine learning tasks may include multiple different content recommendation tasks, e.g., each task may be to effectively recommend content to different users or user groups. The tasks may also include processing input data from the Internet, such as documents, web pages and other resources, for example to determine a score representing a likelihood that a resource relates to a particular topic.

FIG. 1A shows an example neural network system 100. The neural network system 100 is an example of a system implemented as computer programs on one or more computers in one or more locations, in which the systems, components, and techniques described below can be implemented.

The neural network system 100 is a system that receives a network input 102 and processes the network input 102 using a super neural network 110 to generate a network output 112 for the network input 102. In particular, the neural network system 100 is capable of receiving network inputs and generating network outputs for multiple different machine learning tasks. Generally, two machine learning tasks are different if they have different desired outputs for the inputs received for the tasks. For example, two image classification tasks can be different if the object categories into which each task requires classifying input images are different. As another example, two robot learning tasks can be different if the two tasks require generating outputs defining actions to be performed by a robot to reach two different goals.

Because the neural network system 100 is capable of processing inputs for multiple different machine learning tasks, the system 100 also receives task data 152 that specifies which machine learning task is to be performed on the network input 102.

The super neural network 110 includes multiple layers 130A-130N that are arranged in a stack one after the other.

Each of the multiple layers, in turn, includes multiple modular neural networks. That is, although different layers can include different numbers of modular neural networks, each layer includes multiple modular neural networks. For example, layer 130A includes modular neural networks 140A-N while layer 130N includes modular neural networks 140M-P.

The modular neural networks within a given layer are configured to receive a layer input for the layer and to generate a respective modular output. That is, each modular neural network in a given layer receives the same input but may generate a different output. For example, different modular neural networks may have different parameter values.

The configuration and architecture of the modular neural networks is dependent on the tasks for which the super neural network 110 is to be used. Generally, however, each modular neural network includes one or more neural network layers followed by a transfer function layer that applies a transfer function to an output of the plurality of neural network layers. The transfer function can be, for example, an element-wise activation function, e.g., a rectified linear unit function or a sigmoid function.

In particular, the modular neural networks may include convolutional neural network layers, fully-connected neural networks, recurrent neural network layers, or a combination of the above. Modular neural networks in different layers can include different kinds of neural network layers. The modular neural networks in some layers may also include modules that are not neural network layers, e.g., spatial transformer modules, or other kinds of modules that perform operations that are differentiable, with or without trainable parameters.

In some cases, even within a given layer, the architectures of modular neural networks can differ. For example, some modular networks in a given layer may have residual connections while others do not. As another example, some modular networks in a given layer may have skip connections while others do not. As yet another example, some modular networks may include more linear layers than other modular networks in the same layer.

The super neural network 110 also includes a plurality of output layers 150A-150Z.

Each set of output layers includes one or more output layers and corresponds to a different machine learning task from the multiple machine learning tasks for which the super neural network can be used.

Additionally, each set of one or more output layers is collectively configured to receive a stack output, i.e., the output generated by the stack of layers, and to generate a neural network output that is specific to the corresponding machine learning task.

During the processing of a network input by the super neural network 110, only the set of output layers corresponding to the task being performed on the input is used.

In the example of FIG. 1A, output layer 150A is the output layer corresponding to the task identified by the task data 152 and is therefore shown using dashed lines while output layer 150Z does not correspond to the task and is therefore shown using solid lines.

That is, for a task that requires a single type of network output, e.g., a classification task that requires a score vector that includes a respective score for each of multiple categories, the super neural network 110 will include a single output layer, e.g., a softmax output layer, that receives the stack output and generates the network output, e.g., and generates the score vector.

For a task that requires multiple different types of network outputs, on the other hand, the super neural network 110 will include multiple output layers, with each of the multiple output layers corresponding to a different type of network output and each output layer being configured to receive the stack output and to process the stack output to generate a network output of the corresponding type.

For example, for a robotic task that requires a policy readout, i.e., an output that defines a score distribution over possible actions to be performed by the robot, and a value function readout, i.e., an output that estimates the value of being in a current state, the super neural network 110 will include two output layers corresponding to the robotic task, one that receives the stack output and generates the policy readout and another that receives the stack output and generates the value function readout.

To determine how to process the network input 102 and to allow the super neural network 110 to be used for multiple tasks, the neural network system 100 maintains data identifying a respective path for each of the tasks that the super neural network 110 is configured to perform.

The path for a given machine learning task specifies, for each of the layers in the super neural network 110, a proper subset of the modular neural networks in the layer that are designated as active when performing the first machine learning task. Thus, for each of the layers, a given path will include at least one but less than all of the modular neural networks in the layer. Because of the way in which the super neural network 110 has been trained, different machine learning tasks will have different paths through the layers. That is, while different paths may share one or more modular neural networks, two different paths will generally differ by at least one component.

In the example of FIG. 1A, modular neural networks that are in the path for the task identified by the task data 152 are shown using dashed lines. Thus, modular neural network 140A, modular neural network 140N, and modular neural network 140P are in the path and are shown using dashed lines while modular neural network 140M is not in the path and is shown using solid lines.

The system 100 then causes the super neural network 100 to generate the network output 112 for the network input 102 by processing the network input 102 using (i) for each layer, the modular neural networks in the layer that are designated as active by the selected path and (ii) the set of one or more output layers corresponding to the first machine learning task. That is, modular neural networks that are not designated as active by the selected path are not used in processing the network input. In other words, only active modular neural networks receive inputs and generate outputs. Thus, not all of the modular neural networks in the super neural network 110 are used when processing any given network input.

In the example of FIG. 1A, modular neural network 140N, modular neural network 140P, and output layer 150A are used to process the network input 102 while modular neural network 140M and output layer 150Z are not.

To account for multiple modular neural networks in the same layer being active during the processing of a given network input, the super neural network also includes a respective combining layer 132A-132N after each layer of the super neural network 110.

Each combining layer 132A-132N is configured to, during the processing of the network input 102, receive the modular outputs generated by the currently active modular neural networks in the layer before the combining layer and combine, e.g., sum or average, the modular outputs generated by the currently active modular neural networks to generate a combined output.

The combined output for each combining layer (other than the combining layer that is after the last layer in the stack) is the layer input for the layer after the combining layer. Conversely, the combined output for the combining layer that is after the last layer in the stack is the stack output, i.e., the output that is provided to the output layer(s) corresponding to the machine learning task being performed.

To configure the super neural network 110 for use in performing multiple machine learning tasks, the neural network system 100 trains the super neural network 110 on each of the tasks. In particular, when training the super neural network 110 on a given task, the system determines both (i) the path for the machine learning task and (ii) trained values of the parameters of the modular neural networks in the path and, optionally, the set of one or more output layers for the task.

Once the system 100 has trained the super neural network 110 on a given task, the system fixes the parameters of the modular neural networks in the path to the trained values, i.e., so that the values are not modified during later training of the super neural network 110 on different tasks. When training the super neural network 110 on a subsequent task, the system 100 holds fixed values of parameters of any modular neural networks that are in paths for any machine learning tasks in the plurality of machine learning tasks for which a path has already been determined.

Generally, to train the super neural network 110 on a machine learning task, the neural network system 100 performs multiple training rounds to update a population of candidate paths for the machine learning task.

In some cases, for each training round, the system serially trains on a pair of candidate paths and then evaluates the pair of candidate paths to determine how to update the population. Such a training technique is described in more detail below with reference to FIG. 3.

In some other cases, for each training round, the system trains on a large number of candidate paths in parallel and then determines whether to modify each candidate path. Such a training technique is described in more detail below with reference to FIG. 4.

Figure 1B:
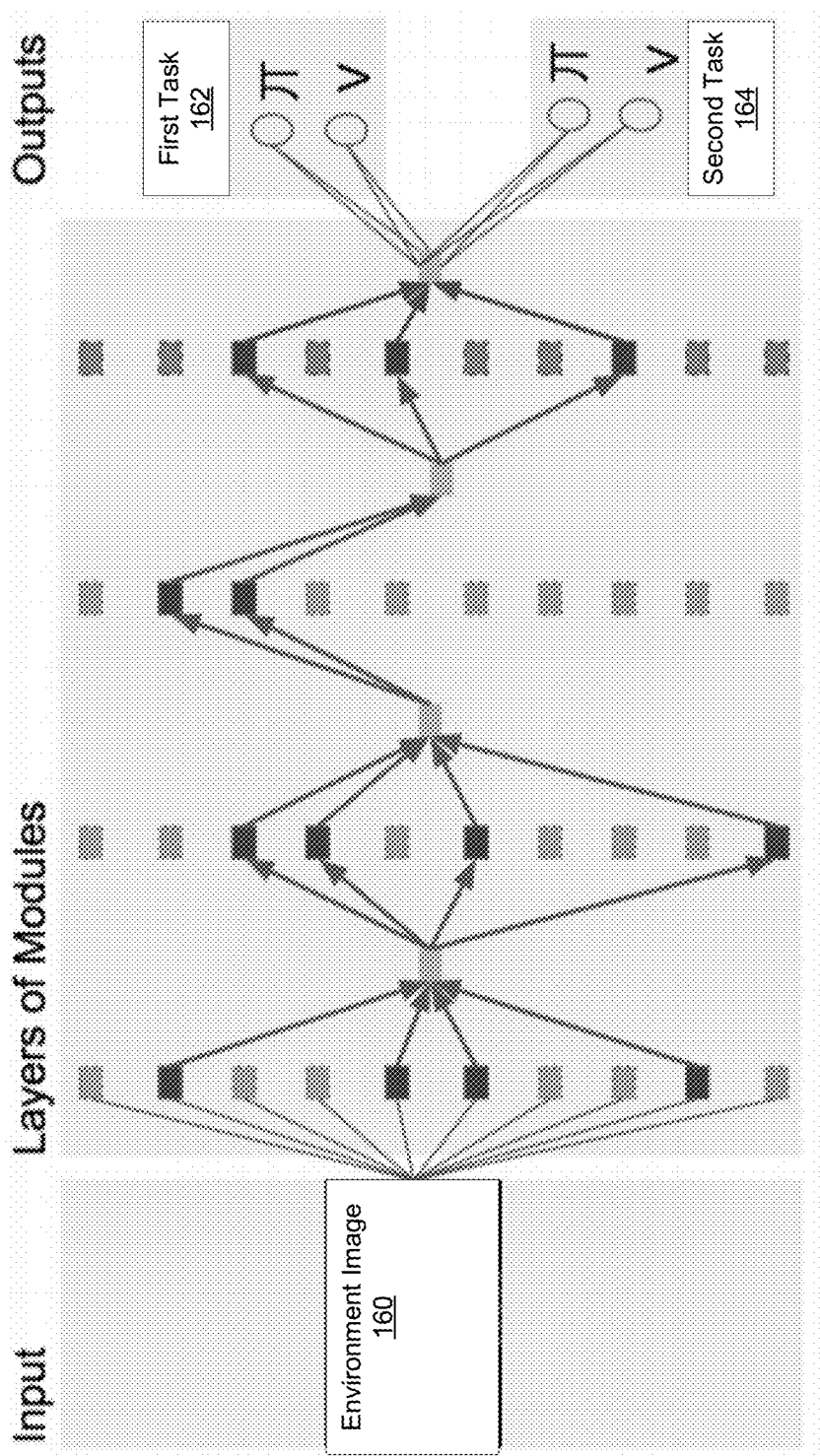
FIG. 1B shows an example path through an example of the super neural network.

FIG. 1B shows an example path through an example of the super neural network 110.

In the example of FIG. 1B, the super neural network 110 is configured to perform two reinforcement learning tasks, a first task 162 and a second task 164. For each task, the super neural network 110 receives as input an environment image 160 that is an image of an environment being interacted with by an agent and generates as output a policy readout and a value readout for use in selecting an action to be performed by the agent. However, each task has a different path through the super neural network 110. In the example of FIG. 1B, the path for the second task 164 is shown and modular neural networks that are in the path are connected by arrows while modular networks that are not in the path are not connected by an arrow. The combining layers after each layer are also connected by arrows. Thus, as can be seen in the example, to generate the outputs for the second task 164, the super neural network 110 uses a subset of the modular networks in each layer, the combining layers, and the output layers for the second task 164 to process the environment image 160. The output layers for the first task 162 and the modular networks that are not in the path are not used.

FIG. 1C shows graphs 170, 180, 190 of various approaches of training neural networks to perform multiple tasks.

In each graph, the horizontal axis shows the combined number of generations required to train a neural network to 0.998 accuracy on two different tasks, which represents the time required for the training. A generation in this context refers to training on a fixed amount of training data. The vertical axis represents frequency, i.e., how many training attempts achieved the 0.998 accuracy in the corresponding number of combined generations.

The graph 170 shows the measurements for an independent control scenario, where two separate fixed-sized networks were trained, one for each task. The graph 180 shows the measurements for a fine-tuning control scenario, where a single network was trained on the first task and then fine-tuned to also perform the second task (but without changing the path through the neural network). The graph 190 shows the measurements for the scenario described in this specification, where each task was trained to have a corresponding path through a super neural network and the path for the first task was fixed while training for the second task.

As can be seen from the graphs 170, 180, and 190, the described scenario results in significantly less time being required to train to achieve the desired accuracy on all of the tasks. In particular, the independent control scenario has a mean of 195 generates, the fine-tuning scenario has a mean of 229 generations, while the described scenario has a mean of only 167 generations.

Figure 2:
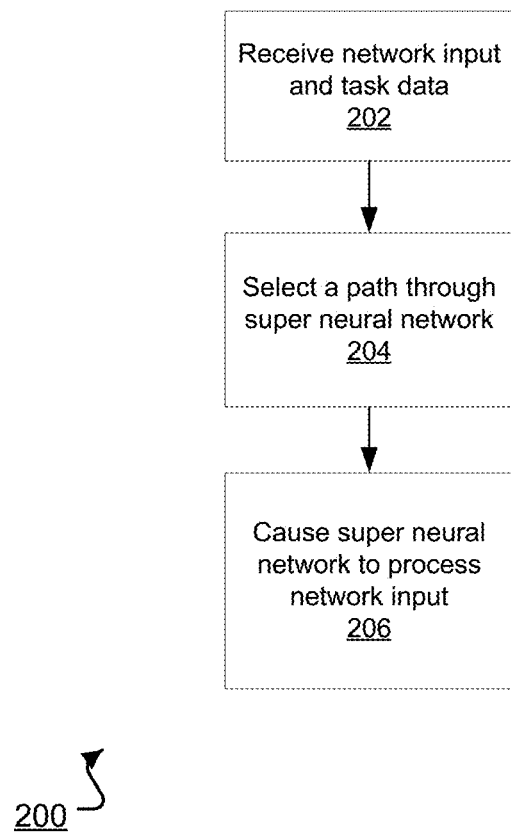
FIG. 2 is a flow diagram of an example process for processing a network input using a super neural network.

FIG. 2 is a flow diagram of an example process 200 for processing a network input using a super neural network. For convenience, the process 200 will be described as being performed by a system of one or more computers located in one or more locations. For example, a neural network system, e.g., the neural network system 100 of FIG. 1A, appropriately programmed, can perform the process 200.

The system receives a network input for processing by the super neural network and task data identifying a machine learning task to be performed on the network input (step 202). The identified machine learning task is one of multiple tasks that the super neural network has been trained to perform.

The system selects a path through the plurality of layers in the super neural network that is specific to the identified machine learning task (step 204).

In particular, the path specifies, for each of the layers in the super neural network, a proper subset, i.e., less than all, of the modular neural networks in the layer that are designated as active when performing the identified machine learning task.

That is, the system maintains data specifying, for each of the multiple tasks on which the super neural network has been trained, a respective path corresponding to the task. Because of the manner in which the super neural network has been trained on the machine learning tasks, each task will have a different corresponding path than each other task. That is, while the paths for two tasks may share one or more modular neural networks, the path for one task will generally include at least one modular neural network that is not included in the path for the other task.

The system then identifies, from the maintained data, the path that corresponds to the identified machine learning task.

The system causes the super neural network to process the network input in accordance with the selected path for the identified machine learning task (step 206).

In particular, the system causes the super neural network to process the network input using (i) for each layer, the modular neural networks in the layer that are designated as active by the selected path and (ii) the set of one or more output layers corresponding to the identified machine learning task. Modular neural networks that are not designated as active by the selected path are not used when processing the input.

The system can cause the super neural network to process the network input in accordance with the selected path by configuring the connectivity of the super neural network and then providing the network input for processing by the neural network. In particular, the system configures the connectivity so that only active modular neural networks receive inputs and generate outputs and so that the one or more output layers corresponding to the identified machine learning task receive the stack output generated by the stack of layers while the other output layers do not receive any input.

Once generated, the system can output the network output or a processed output generated from the network output, e.g., for presentation to a user or to another system for immediate use or for storage.

Figure 3:
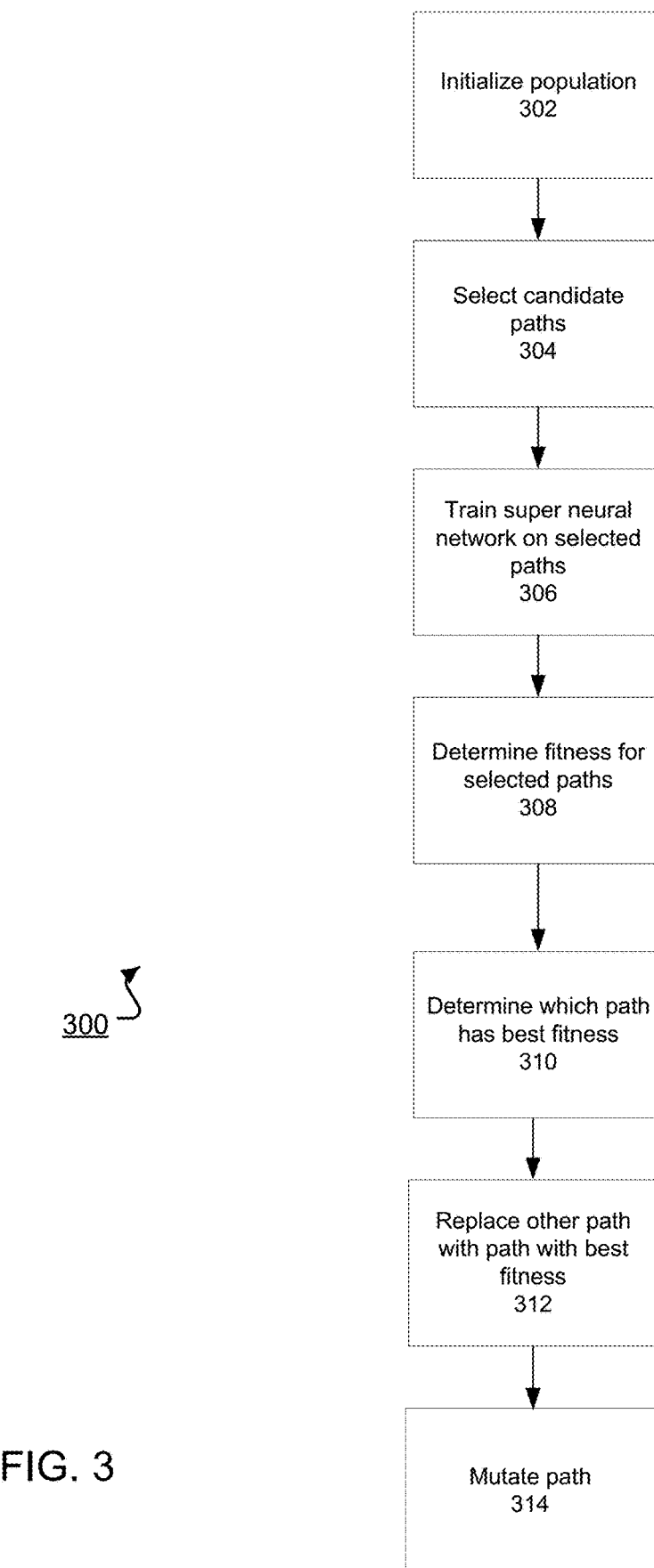
FIG. 3 is a flow diagram of an example process for training a super neural network on a new machine learning task.

FIG. 3 is a flow diagram of an example process 300 for training the super neural network on a new machine learning task. For convenience, the process 300 will be described as being performed by a system of one or more computers located in one or more locations. For example, a neural network system, e.g., the neural network system 100 of FIG. 1A, appropriately programmed, can perform the process 300.

The system initializes a population of candidate paths (step 302).

Each of the candidate paths specifies, for each of the layers of the super neural network, a respective proper subset of the modular neural networks in the layer to designate as active when performing the particular machine learning task.

In particular, the system selects a fixed number of candidate paths randomly, subject to certain criteria. For example, the criteria can specify that each candidate path should include at least a predetermined minimum number of modular neural networks from each of the layers but no more than a predetermined maximum number of modular neural networks from any given layer.

The system selects a pair of candidate paths from the population (step 304). For example, the system can select the pair randomly from the population.

The system trains the super neural network on each of the selected candidate paths (step 306).

In particular, for each of the candidate paths, the system trains the super neural network while processing training inputs using only the modular neural networks designated as active by the candidate path and the output layer corresponding to the particular machine learning task, i.e., and not using any modular neural networks that are not designated as active by the candidate path.

Because the system trains using only the modular neural networks in the path and the output layer(s) corresponding to the task, only the parameter values of the modular neural networks in the path and the output layer(s) corresponding to the task are adjusted during the training. Additionally, if the candidate path includes any modular neural networks that are in paths for any machine learning tasks in the plurality of machine learning tasks for which a path has already been determined, i.e., in paths for tasks on which the super neural network has already been trained, the system holds fixed the values of parameters of those modular neural networks and does not modify the values during the training.

More specifically, for each of the candidate paths, the system trains the super neural network on the candidate path for a fixed amount of time or for a fixed number of training iterations using a machine learning training procedure that is appropriate for the machine learning task. For example, for supervised machine learning tasks, e.g., image classification, machine translation, or speech recognition, the training procedure can be a conventional supervised learning training procedure, e.g., stochastic gradient descent. As another example, for robotic control tasks, the training procedure can be a conventional reinforcement learning training procedure, e.g., an actor-critic technique, a policy gradient technique, or a deep Q-learning technique.

The system determines a fitness of each of the candidate paths based on the results of the training (step 308). Generally, the fitness of a candidate path measures the quality of the outputs being generated using the candidate path. The measure of fitness used can be any measure that is appropriate for the machine learning task. For example, for a supervised learning task, the fitness can be the negative classification error of the super neural network during that period of training. As another example, for a reinforcement learning task, e.g., a robotic control task, where the system trains the super neural network using a reinforcement learning technique and receives rewards as a result of performed actions, the fitness can be the return accumulated while training the candidate path. The return is a time discounted combination, e.g., time discounted sum, of the rewards received while training the path.

The system determines which of the selected candidate paths has the best fitness (step 310) and replaces the other candidate path in the pair, i.e., the path that does not have the best fitness, with a copy of the best fit candidate path in the population (step 312). In some implementations, for the modular networks that were in the path that was replaced, the system maintains the values of the parameters from the training of the replaced path. In other implementations, the system reverts the values of the parameters to the values from before the training of the replaced path began.

The system then mutates the copy of candidate path having the best fitness to generate a mutated candidate path (step 314). Thus, after this step, the population includes both (i) the best fit candidate path and (ii) the mutated copy of the best fit candidate path, but not (iii) the other candidate path in the pair.

The system mutates a given candidate path by changing one or more of the active modular neural networks in the candidate path to a different modular neural network. In particular, the system can mutate a candidate path by determining, for each of the modular neural networks in the candidate path, whether to replace the modular neural network and, in response to determining to replace a modular neural network, designating the modular neural network as inactive and designating another modular neural network in the same layer as active. In some cases, the system picks the different modular neural network randomly from the other modular networks in the same layer. In some other cases, the system picks the different modular neural network randomly from a local neighborhood of the modular neural network within the layer. In some other cases, the system biases the mutation operator such that currently more globally useful modular networks, i.e., networks that are already in one or more paths for one or more other tasks, are more likely to be slotted into the path for the new task.

In some implementations, the system determines whether to replace each of the modular neural networks with a probability that is equal to or proportional to 1 divided by a total number of modular neural networks in the first candidate path, i.e., so that each neural network has the same likelihood of being replaced.

The system can repeatedly perform steps 304-314 for all of the candidate paths in the population to update the population and to adjust the values of the parameters of the super neural network. For example, the system can perform a fixed number of iterations of the steps for each candidate, perform iterations of the steps for a fixed amount of time, or perform iterations of the steps until an error threshold is reached for any of the candidate in the population.

After the training has been completed, i.e., after the last iteration of steps 304-314 has been performed, the system selects the candidate path having the best fitness as the path for the new machine learning task. The system also fixes the values of the parameters of the modular neural networks that are designated as active by the selected path, i.e., so that the values are not adjusted during training of the super neural network on subsequent tasks. For each super neural network that is not part of the selected path and is not part of any selected paths for any other machine learning tasks on which the super network has been trained, the system re-initializes the values of the parameters, i.e., re-sets the values of the parameters to initial values.

Figure 4:
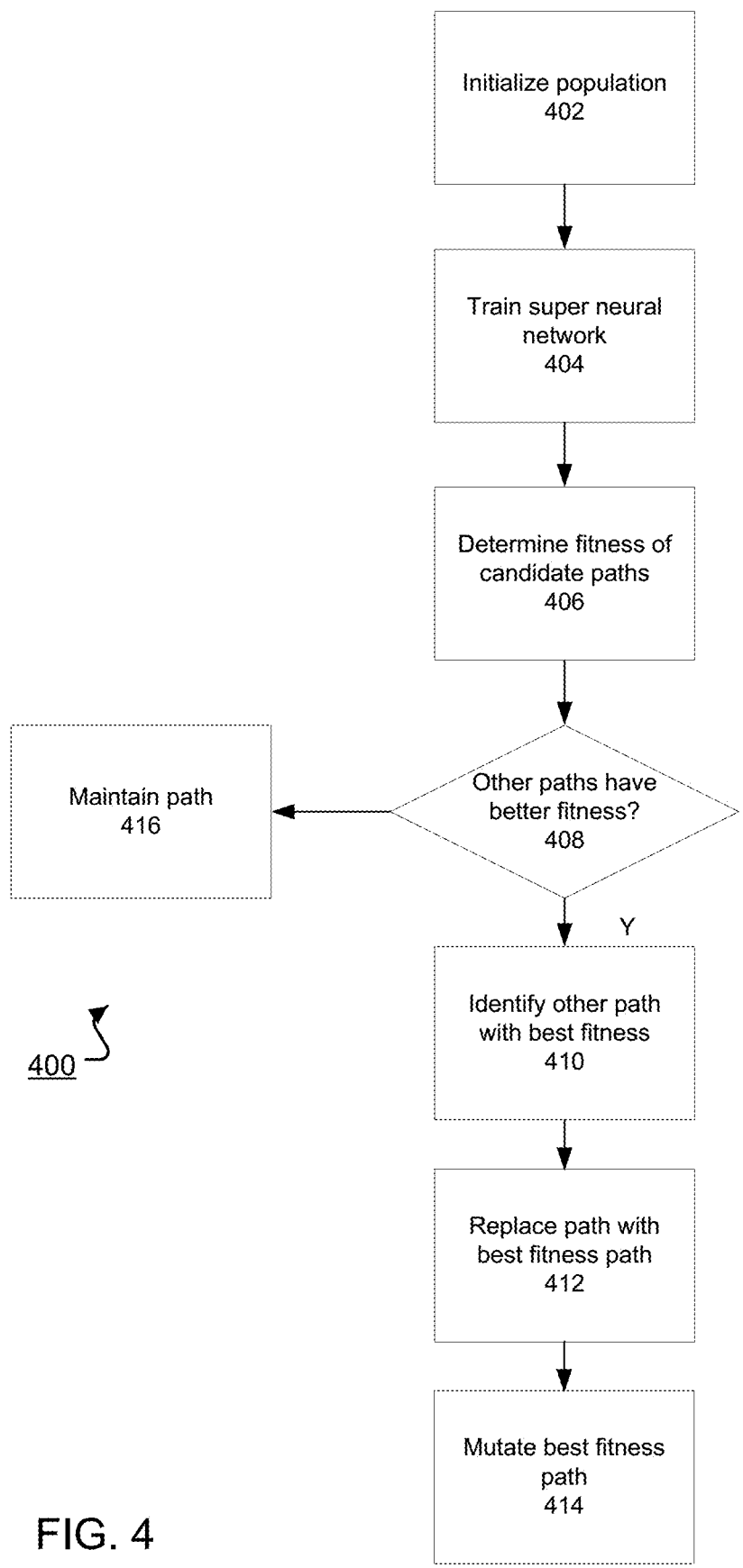
FIG. 4 is a flow diagram of another example process for training a super neural network on a new machine learning task.

FIG. 4 is a flow diagram of another example process 400 for training the super neural network on a new machine learning task. For convenience, the process 400 will be described as being performed by a system of one or more computers located in one or more locations. For example, a neural network system, e.g., the neural network system 100 of FIG. 1A, appropriately programmed, can perform the process 400.

The system initializes a population of candidate paths (step 402). In particular, the system selects a fixed number of candidate paths randomly, subject to the criteria described above.

The system then performs steps 404-416 in parallel for each of the candidate paths in the population.

The system trains the super neural network on a particular candidate path (step 404), i.e., as described above with reference to step 306. During the training, if two or more paths that are being trained on include the same modular neural network, the parameter values of that modular neural network are updated by both of the paths during the round of training.

As described above, if a candidate path includes modular neural networks that are in a path for a task for which the super neural network has already been trained, the system holds the values of the parameters of that modular neural network fixed while training the super neural network on the candidate path.

The system determines a fitness of the particular candidate path based on results of the training of the super neural network on the candidate path (step 406), i.e., as described above with reference to step 308.

The system determines whether any of a subset of other candidate paths in the population has a better fitness than the particular candidate path (step 408). In particular, the system randomly chooses a fixed number of other candidate paths from the population and compares the fitness of the particular candidate path with the fitnesses of the other candidate paths.

If any of the other candidate paths in the subset have a better fitness, the system identifies the candidate path in the subset that has the best fitness of the other candidate paths in the subset (step 410) and replaces the particular candidate path with the identified candidate path having the best fitness (step 412).

The system then mutates the copy of the identified candidate path having the best fitness that was added to the population by changing one or more of the active modular neural networks in the identified candidate path (step 414). In particular, the system mutates the identified candidate path as described above with reference to FIG. 3.

Thus, after this step, the population includes both (i) the identified candidate path having the best fitness and the (ii) the mutated copy of the identified candidate path, but not (iii) the particular candidate path (which has been replaced by the mutated copy).

If none of the candidate paths in the subset have a better fitness, the system maintains the candidate path for further training, i.e., does not remove the particular candidate path from the population (step 416).

The system can repeatedly perform steps 404-416 for all of the candidate paths in the population to update the population and to adjust the values of the parameters of the super neural network. For example, the system can perform a fixed number of iterations of the steps for each candidate, perform iterations of the steps for a fixed amount of time, or perform iterations of the steps until an error threshold is reached for any of the candidate in the population.

In some cases, the system performs the steps 404-416 asynchronously with respect to the various candidates in the population. That is, once the system finishes an iteration of steps 404-416 for a given candidate, the system can begin another iteration without waiting to finish the iteration of the steps for other candidates in the population. In these cases, the system can, while a given candidate path is being evaluated, set the fitness of the path to a large negative number to ensure that the candidate path is not selected for mutation while the candidate path is still being evaluated.

After the training has been completed, i.e., after the last iteration of the steps 404-416 has been performed, the system selects the candidate path in the population having the best fitness as the path for the new machine learning task. The system also fixes the values of the parameters of the modular neural networks that are designated as active by the selected path, i.e., so that the values are not adjusted during training of the super neural network on subsequent tasks. For each super neural network that is not part of the selected path and is not part of any selected paths for any other machine learning tasks on which the super network has been trained, the system re-initializes the values of the parameters, i.e., re-sets the values of the parameters to initial values.

In some cases, the system performs the process 300 or the process 400 for the multiple tasks in sequence, i.e., trains the super neural network on the tasks one after the other and only one task is being trained on at time. In these cases, when training on a given task, the values of the parameters of the modular neural networks in paths for any tasks before the given task in the sequence are held fixed.

In some other cases, the system performs the process 300 or the process 400 concurrently for multiple tasks, i.e., interleaves training on one task with training on another task. In these cases, when training on multiple tasks at the same time, only the values of the parameters of the modular neural networks in paths for tasks on which the super neural network was trained before training on the multiple tasks are fixed. That is, if training has already finished for one more tasks, the paths for those tasks are fixed, but training on one of the multiple concurrent tasks is allowed to impact the training on others of the multiple concurrent tasks.

This specification has described techniques for selecting a path for a given task by repeatedly evaluating and mutating paths. However, other techniques for selecting paths are also possible. For example, reinforcement learning methods, e.g., policy gradient methods, may be used to learn the distribution of pathways as a function of the long term returns obtained by paths, and as a function of a task description input for the new task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a super neural network on a particular machine learning task from a plurality of machine learning tasks, the super neural network comprising:

a plurality of layers arranged in a stack one after the other, wherein each layer comprises a respective plurality of modular neural networks, and wherein the modular neural networks in each layer are each configured to receive a layer input for the layer and to generate a respective modular output; and a plurality of sets of one or more output layers, wherein each set of output layers corresponds to a different machine learning task from the plurality of machine learning tasks, and wherein each set of one or more output layers is configured to receive a stack output and to generate a neural network output that is specific to the corresponding machine learning task, and the method comprising:

selecting a plurality of candidate paths through the plurality of layers, each of the candidate paths specifying, for each of the layers, a respective proper subset of the modular neural networks in the layer that are designated as active when performing the particular machine learning task;

training the super neural network on each of the plurality of candidate paths, wherein training the super neural network on each of the plurality of candidate paths comprises, for each of the candidate paths, training the super neural network while processing training inputs only using the modular neural networks designated as active by the candidate paths and the output layer corresponding to the particular machine learning task;

determining a fitness of each of the plurality of candidate paths based on results of the training of the super neural network on the candidate path; and selecting the candidate path having the best fitness as a best fit path for the particular machine learning task.

2. The method of claim 1, wherein selecting the plurality of candidate paths comprises:

selecting a first candidate path and a second candidate path;

determining, from training the super neural network on the first candidate path and the second candidate path, that the first candidate path has a better fitness than the second candidate path;

based on determining that the first candidate path has a better fitness than the second candidate path:

mutating the first candidate path by changing one or more of the active modular neural networks in the first candidate path; and replacing the second candidate path with the mutated first candidate path.

3. The method of claim 2, wherein mutating the first candidate path comprises, for each modular neural network designated as active by the first candidate path:

determining whether to replace the modular neural network; and in response to determining to replace the modular neural network, designating the modular neural network as inactive and designating another modular neural network in the same layer as active.

4. The method of claim 3, wherein determining whether to replace the modular neural network comprises determining to replace the modular neural network with probability that is equal to or proportional to 1 divided by a total number of modular neural networks in the first candidate path.

5. The method of claim 1, wherein training the super neural network on each of the plurality of candidate paths comprises:

training the super neural network on an initial plurality of candidate paths in parallel, and wherein selecting the plurality of candidate paths comprises:

for each candidate path in the initial plurality:

determining whether any of a subset of other candidate paths in the initial plurality has a better fitness than the candidate path;

if any of the subset have a better fitness:

identifying the candidate path in the subset that has a best fitness of the other candidate paths in the subset;

mutating the identified candidate path by changing one or more of the active modular neural networks in the identified candidate path; and replacing the candidate path with the mutated identified candidate path.

6. The method of claim 5, wherein selecting the plurality of candidate paths comprises:

if none of the candidate paths in the subset have a better fitness:

maintaining the candidate path for further training.

7. The method of claim 5, wherein, for each candidate path in the initial plurality the subset of other candidate paths is chosen randomly.

8. The method of claim 1, wherein training the super neural network on each of the plurality of candidate paths comprises:

during the training, holding fixed values of parameters of any modular neural networks that are in best fit paths for any machine learning tasks in the plurality of machine learning tasks for which a best fit path has already been determined.

9. The method of claim 1, further comprising:

fixing values of parameters of modular neural networks that are designated as active by the best fit path for the particular machine learning task to not be adjusted during training of the super neural network on other tasks in the plurality of machine learning tasks.

10. A system comprising one or more computers and one or more storage devices storing instructions that when executed by the one or more computers cause the one or more computers to perform operations for training a super neural network on a particular machine learning task from a plurality of machine learning tasks, the super neural network comprising:

a plurality of layers arranged in a stack one after the other, wherein each layer comprises a respective plurality of modular neural networks, and wherein the modular neural networks in each layer are each configured to receive a layer input for the layer and to generate a respective modular output; and a plurality of sets of one or more output layers, wherein each set of output layers corresponds to a different machine learning task from the plurality of machine learning tasks, and wherein each set of one or more output layers is configured to receive a stack output and to generate a neural network output that is specific to the corresponding machine learning task, and the operations comprising:

selecting a plurality of candidate paths through the plurality of layers, each of the candidate paths specifying, for each of the layers, a respective proper subset of the modular neural networks in the layer that are designated as active when performing the particular machine learning task;

training the super neural network on each of the plurality of candidate paths, wherein training the super neural network on each of the plurality of candidate paths comprises, for each of the candidate paths, training the super neural network while processing training inputs only using the modular neural networks designated as active by the candidate paths and the output layer corresponding to the particular machine learning task;

determining a fitness of each of the plurality of candidate paths based on results of the training of the super neural network on the candidate path; and selecting the candidate path having the best fitness as a best fit path for the particular machine learning task.

11. The system of claim 10, wherein selecting the plurality of candidate paths comprises:

selecting a first candidate path and a second candidate path;

determining, from training the super neural network on the first candidate path and the second candidate path, that the first candidate path has a better fitness than the second candidate path;

based on determining that the first candidate path has a better fitness than the second candidate path:

mutating the first candidate path by changing one or more of the active modular neural networks in the first candidate path; and replacing the second candidate path with the mutated first candidate path.

12. The system of claim 11, wherein mutating the first candidate path comprises, for each modular neural network designated as active by the first candidate path:

determining whether to replace the modular neural network; and in response to determining to replace the modular neural network, designating the modular neural network as inactive and designating another modular neural network in the same layer as active.

13. The system of claim 12, wherein determining whether to replace the modular neural network comprises determining to replace the modular neural network with probability that is equal to or proportional to 1 divided by a total number of modular neural networks in the first candidate path.

14. The system of claim 11, wherein training the super neural network on each of the plurality of candidate paths comprises:
training the super neural network on an initial plurality of candidate paths in parallel, and wherein selecting the plurality of candidate paths comprises:
for each candidate path in the initial plurality:
determining whether any of a subset of other candidate paths in the initial plurality has a better fitness than the candidate path;
if any of the subset have a better fitness:
identifying the candidate path in the subset that has a best fitness of the other candidate paths in the subset;
mutating the identified candidate path by changing one or more of the active modular neural networks in the identified candidate path; and
replacing the candidate path with the mutated identified candidate path.

15. The system of claim 14, wherein selecting the plurality of candidate paths comprises:
if none of the candidate paths in the subset have a better fitness:
maintaining the candidate path for further training.

16. The system of claim 14, wherein, for each candidate path in the initial plurality the subset of other candidate paths is chosen randomly.

17. The system of claim 11, wherein training the super neural network on each of the plurality of candidate paths comprises:
during the training, holding fixed values of parameters of any modular neural networks that are in best fit paths for any machine learning tasks in the plurality of machine learning tasks for which a best fit path has already been determined.

18. The system of claim 11, the operations further comprising:
fixing values of parameters of modular neural networks that are designated as active by the best fit path for the particular machine learning task to not be adjusted during training of the super neural network on other tasks in the plurality of machine learning tasks.

19. One or more non-transitory computer-readable storage media storing instructions that when executed by one or more computers cause the one or more computers to perform operations for training a super neural network on a particular machine learning task from a plurality of machine learning tasks, the super neural network comprising:

a plurality of layers arranged in a stack one after the other, wherein each layer comprises a respective plurality of modular neural networks, and wherein the modular neural networks in each layer are each configured to receive a layer input for the layer and to generate a respective modular output; and
a plurality of sets of one or more output layers, wherein each set of output layers corresponds to a different machine learning task from the plurality of machine learning tasks, and wherein each set of one or more output layers is configured to receive a stack output and to generate a neural network output that is specific to the corresponding machine learning task, and the operations comprising:
selecting a plurality of candidate paths through the plurality of layers, each of the candidate paths specifying, for each of the layers, a respective proper subset of the modular neural networks in the layer that are designated as active when performing the particular machine learning task;
training the super neural network on each of the plurality of candidate paths, wherein training the super neural network on each of the plurality of candidate paths comprises, for each of the candidate paths, training the super neural network while processing training inputs only using the modular neural networks designated as active by the candidate paths and the output layer corresponding to the particular machine learning task;
determining a fitness of each of the plurality of candidate paths based on results of the training of the super neural network on the candidate path; and
selecting the candidate path having the best fitness as a best fit path for the particular machine learning task.

20. The computer-readable storage media of claim 19, wherein selecting the plurality of candidate paths comprises:
selecting a first candidate path and a second candidate path;
determining, from training the super neural network on the first candidate path and the second candidate path, that the first candidate path has a better fitness than the second candidate path;
based on determining that the first candidate path has a better fitness than the second candidate path:
mutating the first candidate path by changing one or more of the active modular neural networks in the first candidate path; and
replacing the second candidate path with the mutated first candidate path.

* * * * *

UNITED STATES PATENT AND TRADEMARK OFFICE
CERTIFICATE OF CORRECTION

| | | |
|---|---|---|
| PATENT NO. | : 11,790,238 B2 | Page 1 of 1 |
| APPLICATION NO. | : 16/995655 | |
| DATED | : October 17, 2023 | |
| INVENTOR(S) | : Wierstra et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this
Eighth Day of July, 2025

Coke Morgan Stewart
*Acting Director of the United States Patent and Trademark Office*